United States Patent [19]

Tweedy et al.

[11] Patent Number: 4,880,100
[45] Date of Patent: Nov. 14, 1989

[54] ADJUSTABLE WORKPIECE ROTATING DEVICE

[75] Inventors: Mark Tweedy, Mars; Gary McCoy, Evans City, both of Pa.

[73] Assignee: Carl Strutz & Company, Inc., Mars, Pa.

[21] Appl. No.: 192,000

[22] Filed: May 9, 1988

Related U.S. Application Data

[63] Continuation of Ser. No. 932,701, Nov. 19, 1986, abandoned.

[51] Int. Cl.⁴ .............................................. B41F 17/20
[52] U.S. Cl. .................................... 198/379; 101/40.1
[58] Field of Search ................... 101/38 A, 38 R, 124; 74/29; 198/379

[56] References Cited

U.S. PATENT DOCUMENTS

| | | | |
|---|---|---|---|
| 3,260,194 | 7/1966 | Karlyn | 101/124 X |
| 3,429,045 | 5/1966 | Karlyn | 101/124 X |
| 3,490,363 | 1/1970 | Derrickson | 101/38 R |
| 3,499,336 | 3/1970 | Bianchi | 74/29 |
| 4,091,726 | 5/1978 | Walker | 101/38 A |

FOREIGN PATENT DOCUMENTS 87986 6/1982 Japan ................................ 101/38 A Primary Examiner—Clifford D. Crowder
Attorney, Agent, or Firm—Clifford Poff

[57] ABSTRACT

An adjustable workpiece rotating assembly for rotating a workpiece of any of a plurality of configurations at a workstation positioned along a conveyor system. Workpiece carriers attached to the conveyor system allow the workpiece to be positioned thereupon at a desired orientation relative to the work station. A mouth piece and base cup engage opposite ends of the workpiece and cause the workpiece to be rotated about a longitudinal axis thereof. The mouth piece and base cup are supported by a vertical displaceable rack which engage with a rotatably spur gear to allow the mouth piece and base cup to be translated simultaneously in the vertical direction to engage with a workpiece of any one of different elevations.

8 Claims, 3 Drawing Sheets

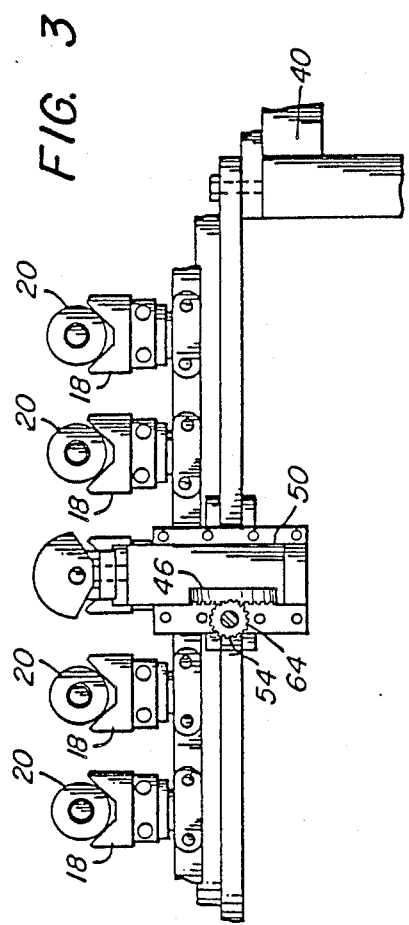
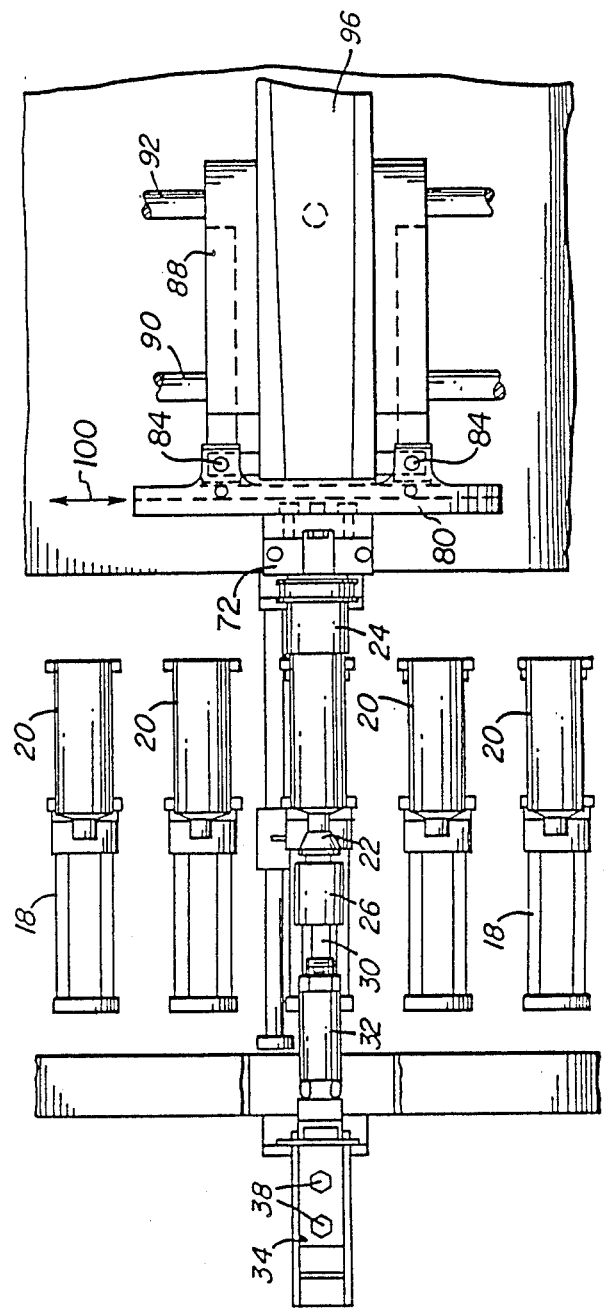

ADJUSTABLE WORKPIECE ROTATING DEVICE

This application is a continuation of Ser. No. 932,701, filed Nov. 19, 1986, now abandoned.

BACKGROUND OF THE INVENTION

1. Field of the Invention: The present invention relates generally to production line apparatus, and, more particularly, to an adjustable workpiece rotating device.

2. Description of the Prior Art: In production facilities, many production lines require identical operations to be performed upon large numbers of identical items. In such situations, use is quite often made of conveyors in which individual workpieces are conveyed from an entry location to a work location to a discharge location, in an automated manner thereby functioning as a production line system. Numerous work stations are typically positioned along the conveyor.

For example, when large numbers of containers must be printed with information thereupon, use of such a production line system is most advantageous. By delivering to a conveyor a plurality of unmarked containers, and by conveying the containers sequentially to a work station functioning as a printing station, whereat the plurality of unmarked containers may be printed with the desired information thereupon in an automated manner. During printing, the container must typically be rotated around 360 degrees to allow printing around the total surface of the container. Additional work stations along the conveyor are used to cure the printed information, typically by heating the containers. Rotation of the containers is also usually required at the additional work stations. Rotation of the container requires the container to be mounted on a mounting means which is capable of being rotated.

An automated production line system, however, requires a significant capital investment. To justify the cost of such a system, use of the system must be more than just occasional. For instance, the cost of such a system may not be justified for an automated production line system if the system is only intermittently used, but if the automated system may be adapted for use in the production of more than one product to thereby allow continual use of the system, the additional costs of an automated production line system may be justified.

If a printing station used to print information on containers may be adapted for the use thereof with containers of various configurations, the cost of automating such a system which may otherwise not be justified may be justifiable. Further, an existing work station of a production line system, if adapted to be capable of being used in production runs of different sized workpieces, would greatly improve the efficiency of the production line.

However, in order to maximize efficiency, the changes which must be made to the work stations to allow work to be performed on the differently sized workpieces of various configurations must be made quickly to prevent excessive downtime of the system. Existing work stations, however, either cannot be adapted for use with different sizes of workpieces, or, allow changes to be made only after extensive downtime.

It is, therefore, an object of the present invention to overcome the disadvantages associated with the prior art.

It is a further object of the present invention to provide a device which allows a workpiece of any of many diameters to be rotate while maintaining the workpiece at a desired orientation.

It is a still further object of the present invention to provide a workpiece rotation device which may be quickly and simply adjusted to allow workpieces of various configurations to be rotated thereby.

SUMMARY OF THE PRESENT INVENTION

In accordance with the present invention, an adjustable workpiece rotating assembly for rotating a workpiece at a work station positioned along a conveyor system includes positioning means for positioning the workpiece in the work station at a desired orientation relative to the work station, and a vertical positioning means for positioning a rotating means at a desired vertical position to allow the rotating means to engage the workpiece and for rotating the workpiece about a longitudinal axis thereof.

BRIEF DESCRIPTION OF THE DRAWINGS

The invention may be better understood and further advantages and uses thereof more readily apparent when considered in view of the following detailed description of exemplary embodiments taken with the accompanying drawings in which:

FIG. 2 is an overhead view of the illustration of the adjustable workpiece rotating assembly of FIG. 1 positioned above a conveyor upon which a plurality of bottles have been positioned;

FIG. 3 is a cross-sectional view of the adjustable workpiece rotating assembly of FIG. 1 taken along A—A.

DESCRIPTION OF THE PREFERRED EMBODIMENT

Figure 1:
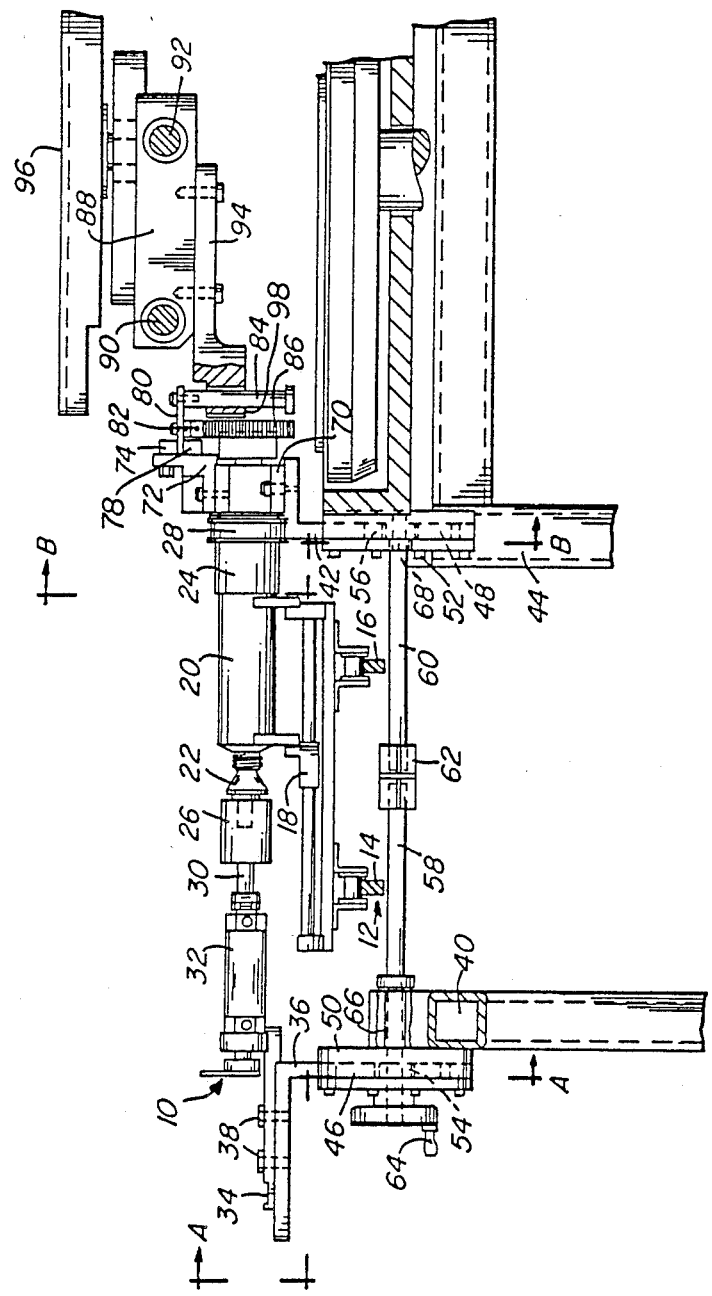
FIG. 1 is a side view, in elevation, of the adjustable workpiece rotating assembly of the present invention.

Referring now to FIG. 1, there is shown a side view, in elevation, of the adjustable workpiece rotating assembly 10 of the present invention. The assembly 10 is positioned above a conventional endless conveyor 12 (coming out of the page of the illustration of FIG. 1), which includes two chains, 14 and 16, rotated about two sets of sprockets (not shown). Positioned upon the chains 14 and 16 is a plurality of workpiece carrier assemblies 18 used to support a workpiece 20, such as a bottle or a plastic, cylindrical container, thereupon. Shown in the side view of FIG. 1 is one workpiece 20 and one workpiece carrier assembly 18; while shown in the overhead view of FIG. 2 and the cross-sectional view of FIG. 3 is a plurality of workpieces 20 and workpiece carrier assemblies 18.

The adjustable workpiece rotating assembly 10, which comprises part of a work station of a production line system, mounts the workpiece 20 thereupon and rotates the workpiece 20 once mounted. The mounting means required for mounting the workpiece thereupon includes a cone-shaped mouth piece 22 and a base cup 24 for connecting with the mouth and the bottom end, respectively, of the workpiece 20. Mouth piece 22 and base cup 24 must conform to the particular dimensions of the workpiece 20. Mouth piece 22 is, therefore, removable from spindle 26, and base cup 24 is removable from rotatable shaft 28. Spindle support 26 is further attached to translatable shaft 30 which in turn extends into air cylinder 32. Cylinder 32 is externally operated, and when actuated, causes translation of shaft 30. Plate 34 attached beneath and extending out from air cylinder 32 is fixedly attached to angled piece 36 by threaded screw members 38.

In the prior art, angled piece 36 was fixedly attached to support beam 40 or some other supporting structure by bolt members. Each time in which the dimensions of workpiece 20 changed, the bolt members had to be detached from support beam 40, and reattached at a different location once mouth piece 22 was positioning at a different elevation corresponding to the elevation of the mouth of workpiece 20. Similarly, in the prior art, angled piece 42 was also fixedly attached to support beam 44 or some other support structure by bolt members. Each time that the dimensions of workpiece 20 changed, the bolt members had to be detached from support beam 44 and reattached at a different location once a new base cup 24 was positioned at a different elevation corresponding to the elevation and dimensions of the base of workpiece 20 Such a requirement was a laborious task.

Figure 4:
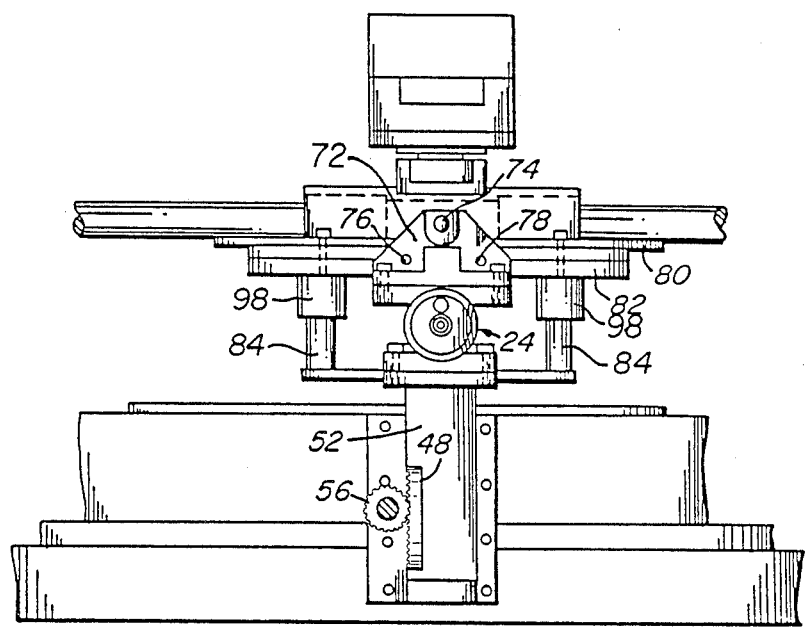
FIG. 4 is a cross-sectional view of the adjustable workpiece rotating assembly of FIG. 1 taken along line B—B.

However, included with the assembly of the present invention, angled pieces 36 and 42 contain downwardly extending gear racks 46 and 48 on the vertical portions thereof, respectively. Angled piece 36 and gear rack 46 extend into C-shaped housing 50. Similarly, angled piece 42 and gear rack 48 extend into C-shaped housing 52. Housings 50 and 52 are fixedly secured, by suitable means, to support beams 40 and 44, respectively. Rotatably received within respective housings 50 and 52 are spur gears 54 and 56. Gear racks 46 and 48 mesh with spur gears 54 and 56, respectively. The meshing of gears 46 and 54 is most clearly seen in the crosssectional view of FIG. 3. Similarly, the meshing of gears 48 and 56 is most clearly seen in the crosssectional view of FIG. 4. Spur gears 54 and 56 are fixedly connected to rotatable shafts 58 and 60. Shafts 58 and 60 are, in turn, attached to one another through coupling 62. Shafts 58 and 60 are held in position by radial bearings 66 and 68. Connected in line with spur gears 54 and 56 and shafts 58 and 60 is rotatable handle 64. Rotation of handle 64 causes rotation of spur gears 54 and 56 which in turn causes translation of angled pieces 36 and 42. By merely rotating the handle 64, the assembly 10 may be adapted for use with workpieces 20 of different dimensions. The vertical position of angled pieces 36 and 42 determines the vertical position of mouth piece 22 and base cup 24. Once the angled pieces 36 and 42 have been translated to a desired position, handle 64 is locked into position to prevent further rotation of shafts 58 or 60.

Fixedly attached above angled piece 42 is housing 70 which allows shaft 28 to extend therethrough. Mounted upon housing 70 is piece 72 containing bore holes to allow needle bearings 74, 76, and 78 to extend therethrough. Closely and rollably received between upper needle bearing 74 and lower needle bearings 76 and 78 is guide bar 80. Fixedly connected beneath guide bar 80 is gear rack 82 which extends in and out of the page in the illustration of FIG. 1. Further attached to guide bar 80 are downwardly directed shafts 84. Translation of angled piece 42, therefore, also causes translation of housing 70, piece 72, guide bar 80, gear rack 82, and shaft 84.

Gear rack 82 provides the means for rotating workpiece 20. Because of the position of guide bar 80 between needle bearings 74, 76, and 78, guide bar 80 is capable of translation relative to piece 72 into and out of the illustration of FIG. 1, in the directions indicated by arrow 100 in FIG. 2, and to the left and right of the illustration of FIG. 4. Because gear rack 82 is fixedly connected to guide bar 80, gear rack 82 is also capable of such translation. Spur gear 86 connected in line with rotatable shaft 28 is caused to be rotated upon translation of gear rack 82, in turn causing rotation of base cup 24.

Translation of guide bar 80 is caused by an external drive means which causes translation of drive plate 88 back and forth along linear shafts 90 and 92. Member 94 is fixedly attached to drive plate 88 and, when translated, contacts shafts 84 through yoke members 98 causing horizontal translation of shafts 84 and guide bar 80 attached thereto.

In operation, the adjustable workpiece rotating assembly 10 of the present invention allows workpieces 20 of a wide range of diameters to be rotated. By merely rotating handle 64 which causes translation of angled pieces 36 and 42 up or down, mouth piece 22 and base cup 24 may be positioned to mount a workpiece 20 thereupon. Because shaft 84 is also translated with translation of the piece 42, guide bar 80 and spur gear 86 used to rotate workpiece 20 need not be disconnected from the assembly 10 when translation of the assembly 10 is required.

A typical sequence of the operation of the adjustable workpiece rotating assembly 10 in a production commence when the conveyor 12 indexes a workpiece 20 in-line with the mouth piece 22 and base cup 24. Initially, air cylinder 32 is not actuated, but once the workpiece 20 is in position, cylinder 32 is actuated causing translation of shaft 30, and in turn translation of mouth piece 22. Translation of mouth piece 22 causes the mouth piece to become inserted in the mouth of workpiece 20. Further translation of shaft 30 causes translation of workpiece 20 until the base of the workpiece comes to rest in base cup 24. An optical step further includes pressurizing the interior of the container by an air supply line extending through mouth piece 22. At this point drive plate 88 translates causing gear rack 82 to translate, in turn causing spur gear 86 to rotate, thereby causing rotation of workpiece 20. The the preferred embodiment, drive plate 88 is connected to oscillating lever 96, and translates in response to oscillation thereof. Alternatively, translation of drive plate 88 may be caused by any conventional means. In the event that adjustable workpiece rotating assembly is part of a printing station, printing on the workpiece 20 occurs during the rotation thereof. Air flow to air cylinder 32 is then reversed, allowing retraction of shaft 30 and mouth piece 22, and in turn disengaging workpiece 20 from base cup 24. Conveyor 12 then indexes to the next workpiece 20 where the process repeats.

While the present invention has been described in connection with the preferred embodiments shown in FIGS. 1–4, it is understood that other similar embodiments may be used or modifications and additions may be made to the described embodiment for performing the same functions of the present invention without deviating therefrom. Therefore, the present invention should not be limited to any single embodiment, but rather construed in breadth and scope in accordance with the recitation of the appended claims.

We claim as our Invention:

1. An adjustable workpiece rotating assembly for rotating a workpiece having at least two opposite ends at a work station positioned along a conveyor system, including:
- means attached to the conveyor system for positioning the workpiece such that the longitudinal axis thereof extends at a predetermined, desired elevation relative to the work station;
- first means for engaging with a first end of a workpiece;
- second means for engaging with a second end of a workpiece;
- means coupled to at least one of the engaging means for rotating the workpiece about the longitudinal axis thereof after said first and second engaging means, respectively, have engaged with the workpiece;
- first support means connected to the first engaging means, said first support means having mounted thereupon a downwardly extending gear rack means;
- second support means connected to the second engaging means, said second support means having mounted thereupon a downwardly extending gear rack means;
- first spur gear means positioned to allow meshing engagement with the gear rack means of the first support means;
- second spur gear means positioned to allow meshing engagement with the gear rack means of the second support means; and
- means rotatably supported at a fixed vertical location at the work station for connecting the first and the second spur gear means theretogether such that rotation of the first spur gear means causes a corresponding rotation of the second spur gear means, and to thereby cause vertical translation of the first and second support means, and the first and second engaging means connected thereto, respectively, responsive to such rotation.

2. The adjustable workpiece rotating assembly of claim 1 wherein said first engaging means and said second engaging means include a mouthpiece and a base cup, respectively, for engaging with opposite ends of the workpiece.

3. The adjustable workpiece rotating assembly of claim 2 wherein the rotating means is coupled to said base cup.

4. The adjustable workpiece rotating assembly of claim 3 wherein said rotating means includes a drive means upon which is positioned a gear rack, and a spur gear having a shaft extending therefrom, said shaft further being coupled to the base cup, wherein translation of the drive means causes translation of the gear rack, and, in turn, rotation of the spur gear and the base cup.

5. The adjustable workpiece of claim 4 wherein said first support means and said second support means, respectively, each include angled pieces fixedly connected along first portions thereof to the first engaging means and the second engaging means, respectively, said angled pieces further having second vertical extending portions.

6. The adjustable workpiece rotating assembly of claim 5 wherein said downwardly extending gear rack means of the first and the second support means, respectively, are positioned on the second vertically extending portions of the angled pieces.

7. The adjustable workpiece rotating assembly of claim 4 wherein said drive means causes reciprocating movement of the gear rack.

8. The adjustable workpiece rotating assembly of claim 7 wherein said drive means is slidably positioned upon linear shafts to allow reciprocating movement thereon.

* * * * *